United States Patent
Secunda

[15] 3,673,661
[45] July 4, 1972

[54] ROLLER BEARING ASSEMBLY FIXTURE

[72] Inventor: Kenneth Secunda, Detroit, Mich.

[73] Assignee: Federal-Mogul Corporation, Southfield, Mich.

[22] Filed: Sept. 29, 1970

[21] Appl. No.: 76,530

[52] U.S. Cl. ...............................................29/201
[51] Int. Cl. .........................................B23p 19/04
[58] Field of Search..............29/201, 200 B, 148.4 A, 211, 29/211 D

[56] References Cited

UNITED STATES PATENTS 2,995,809   8/1961   Riedel..................................29/201

*Primary Examiner*—Thomas H. Eager
*Attorney*—Harness, Dickey & Pierce

[57] ABSTRACT

Apparatus for assembling rollers into pockets in a split retainer and in assembly with a double shouldered race member.

27 Claims, 12 Drawing Figures

INVENTOR.
Kenneth Secunda

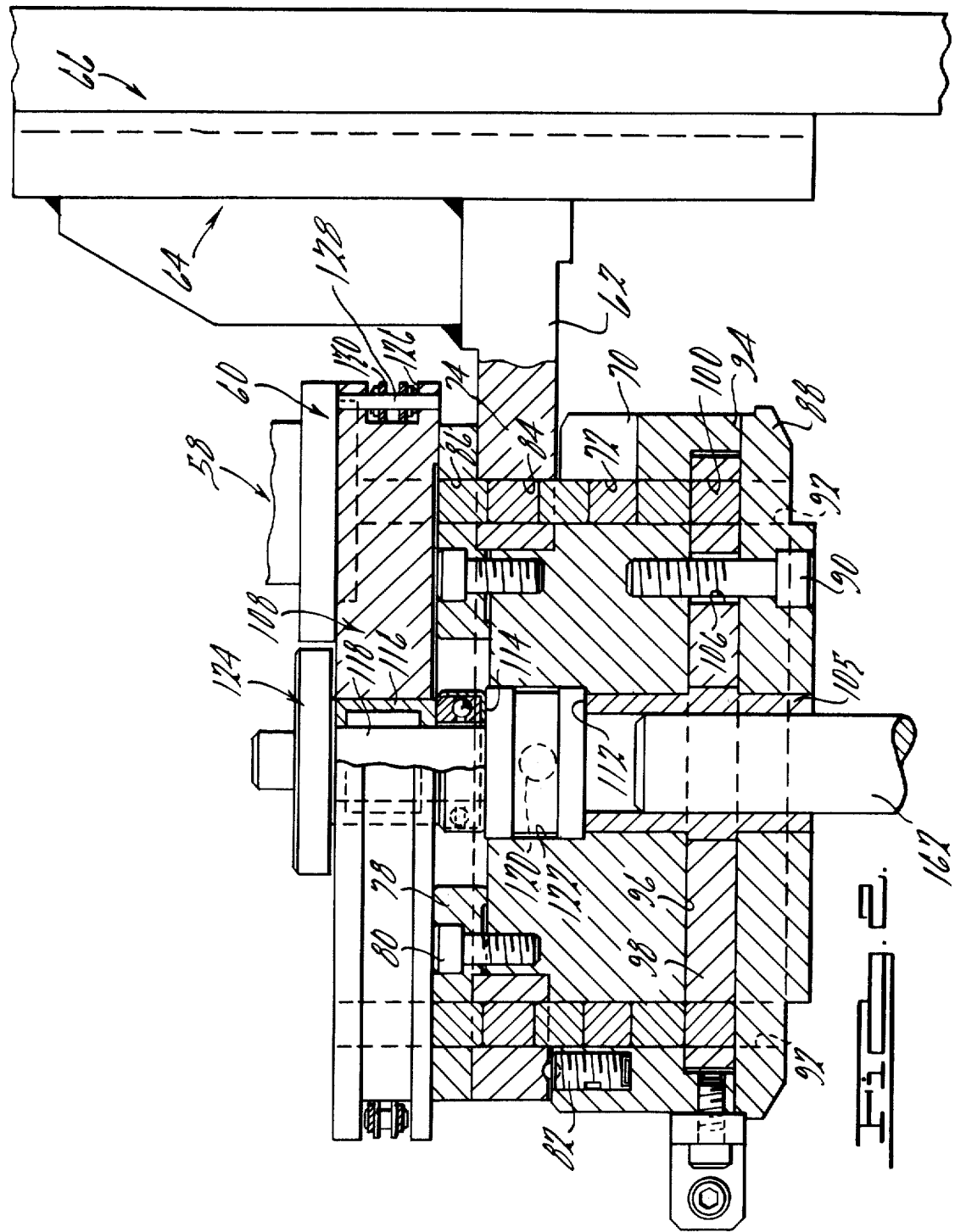

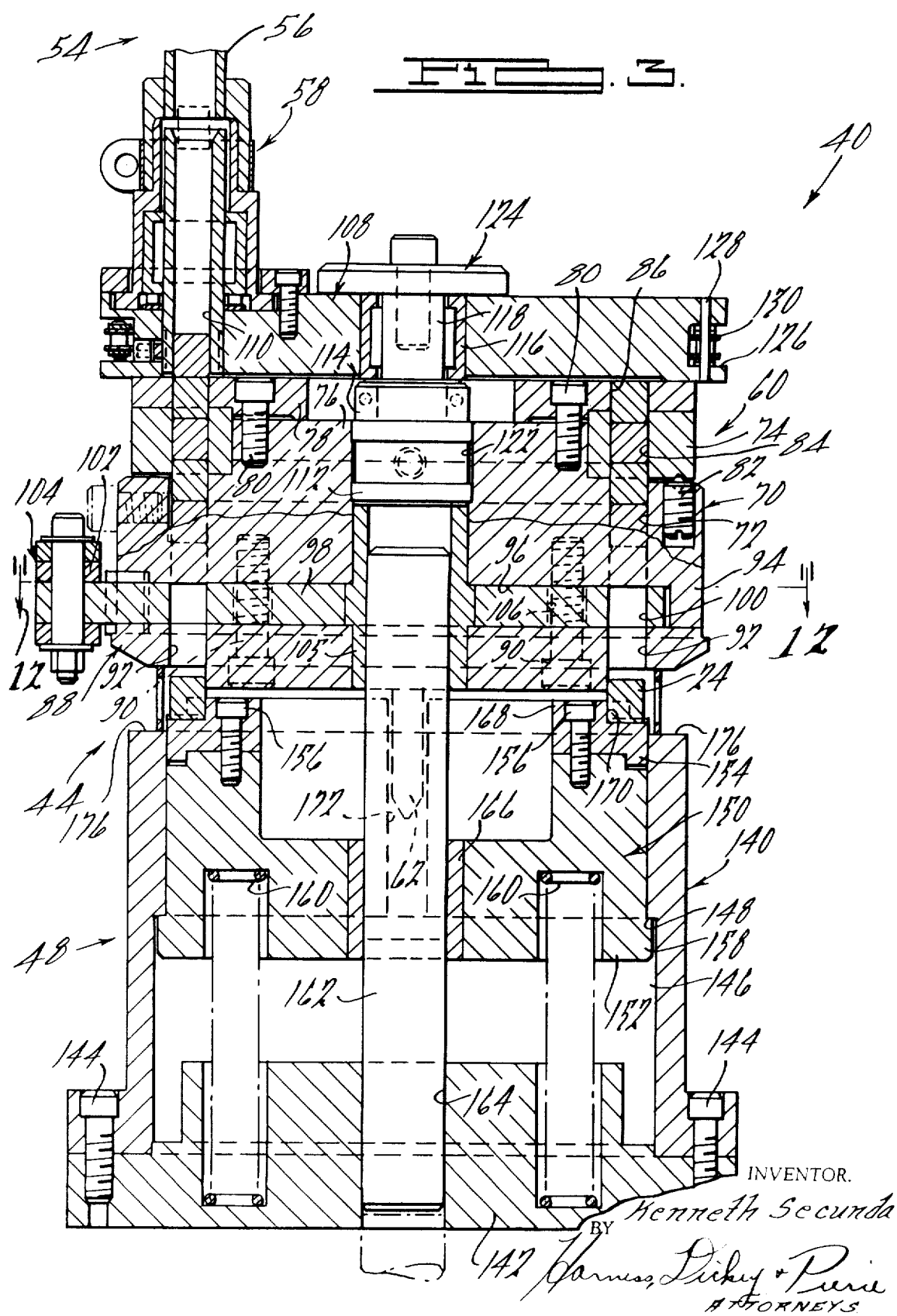

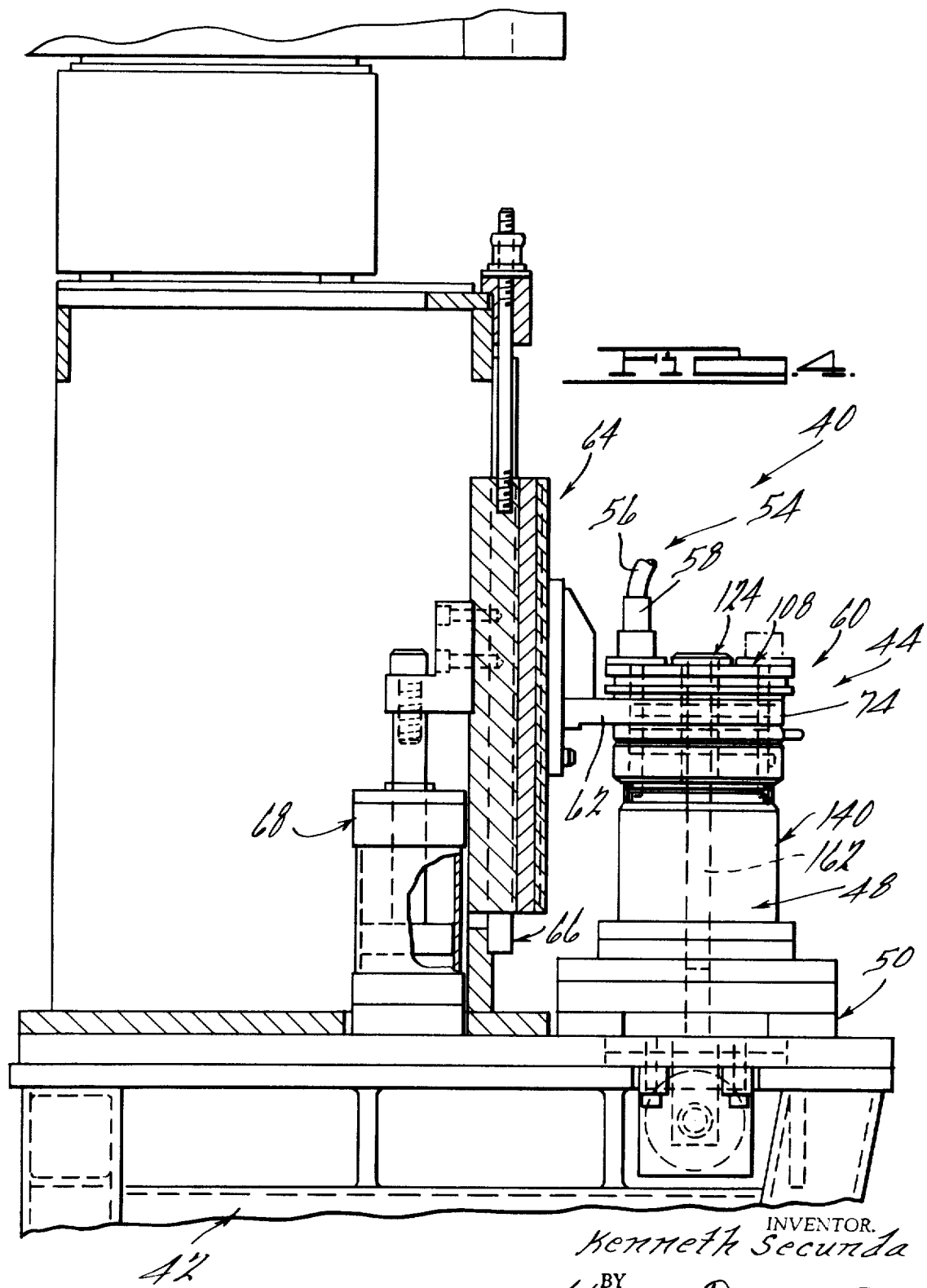

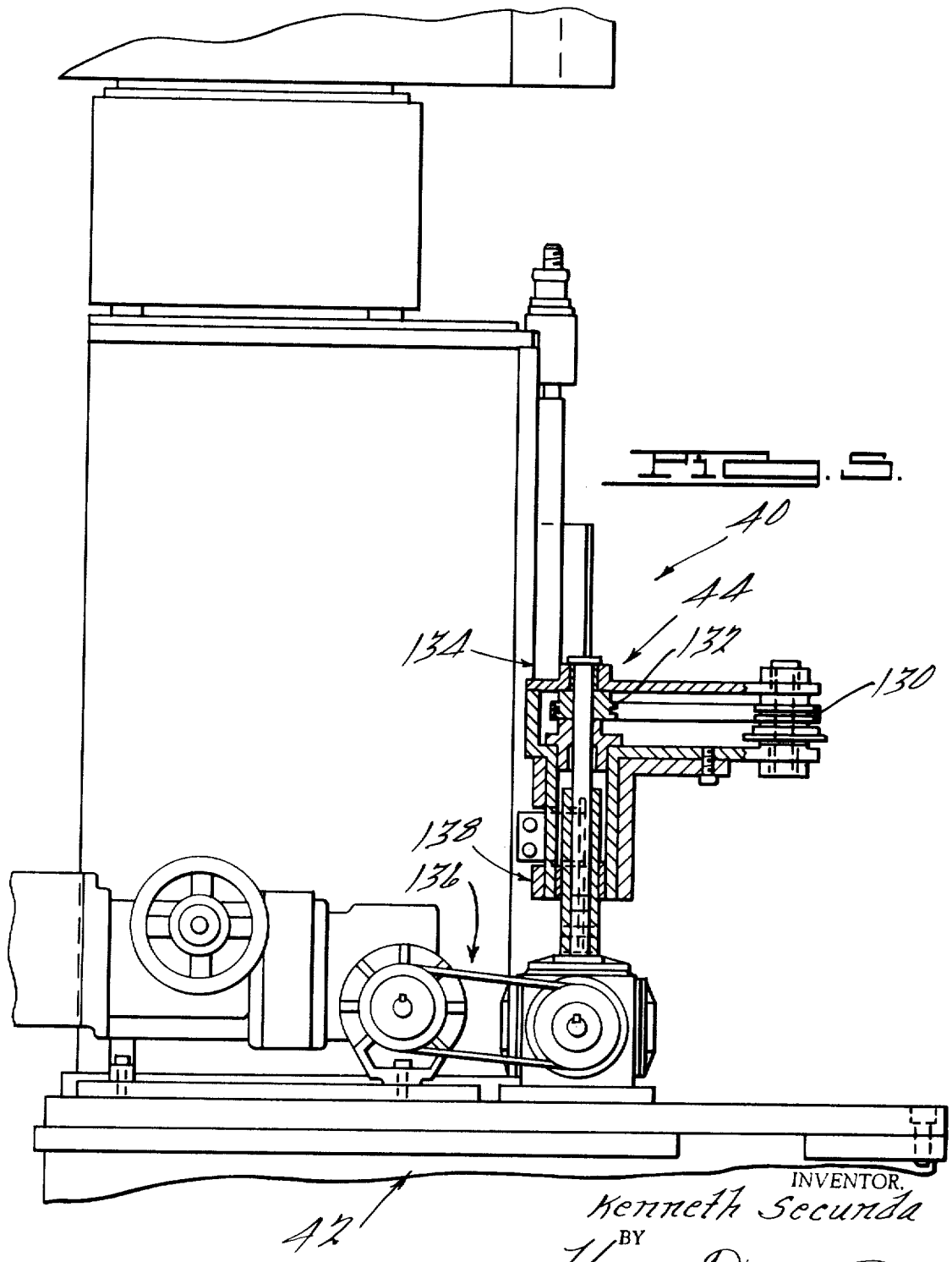

INVENTOR.
Kenneth Secunda

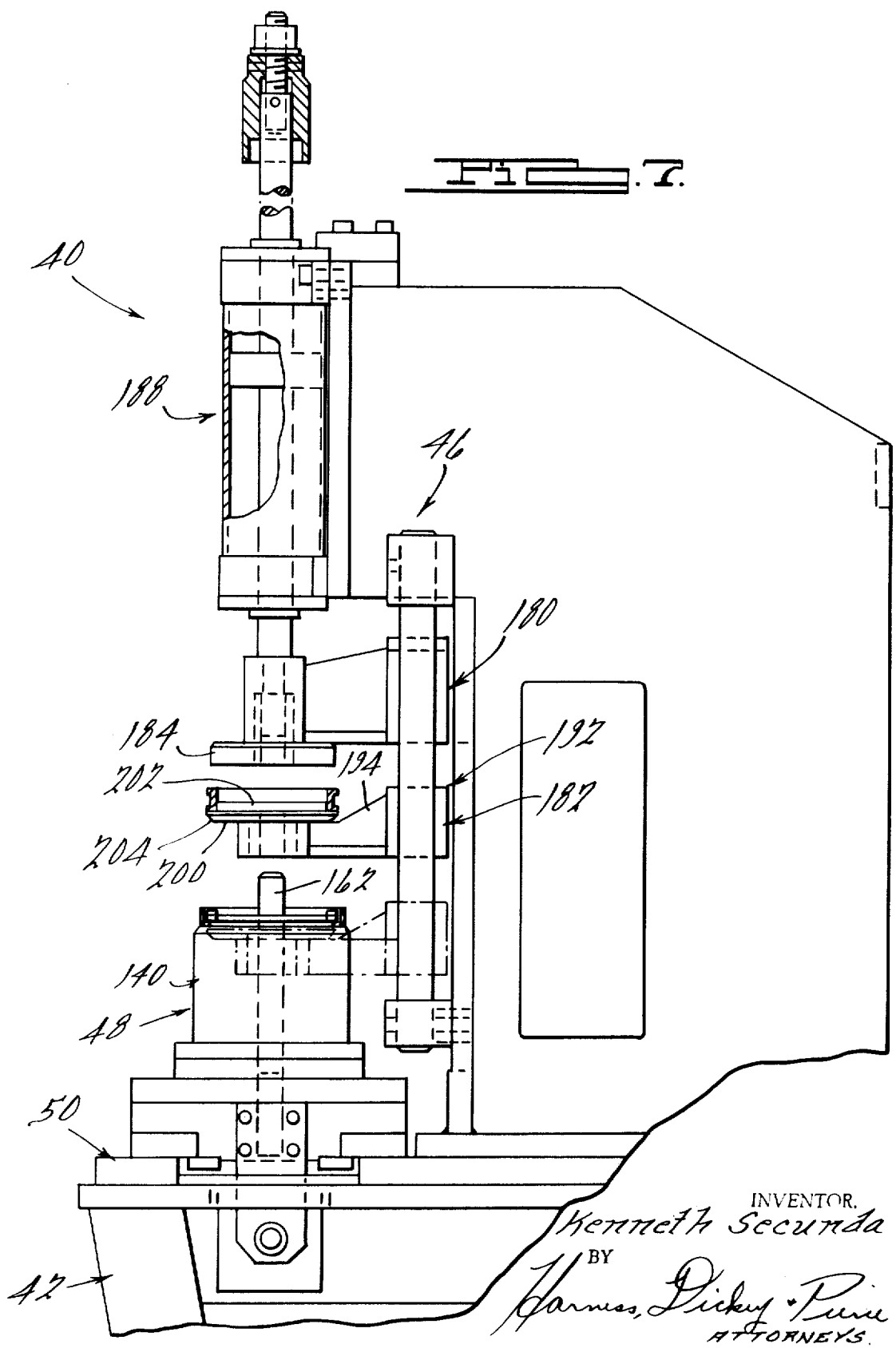

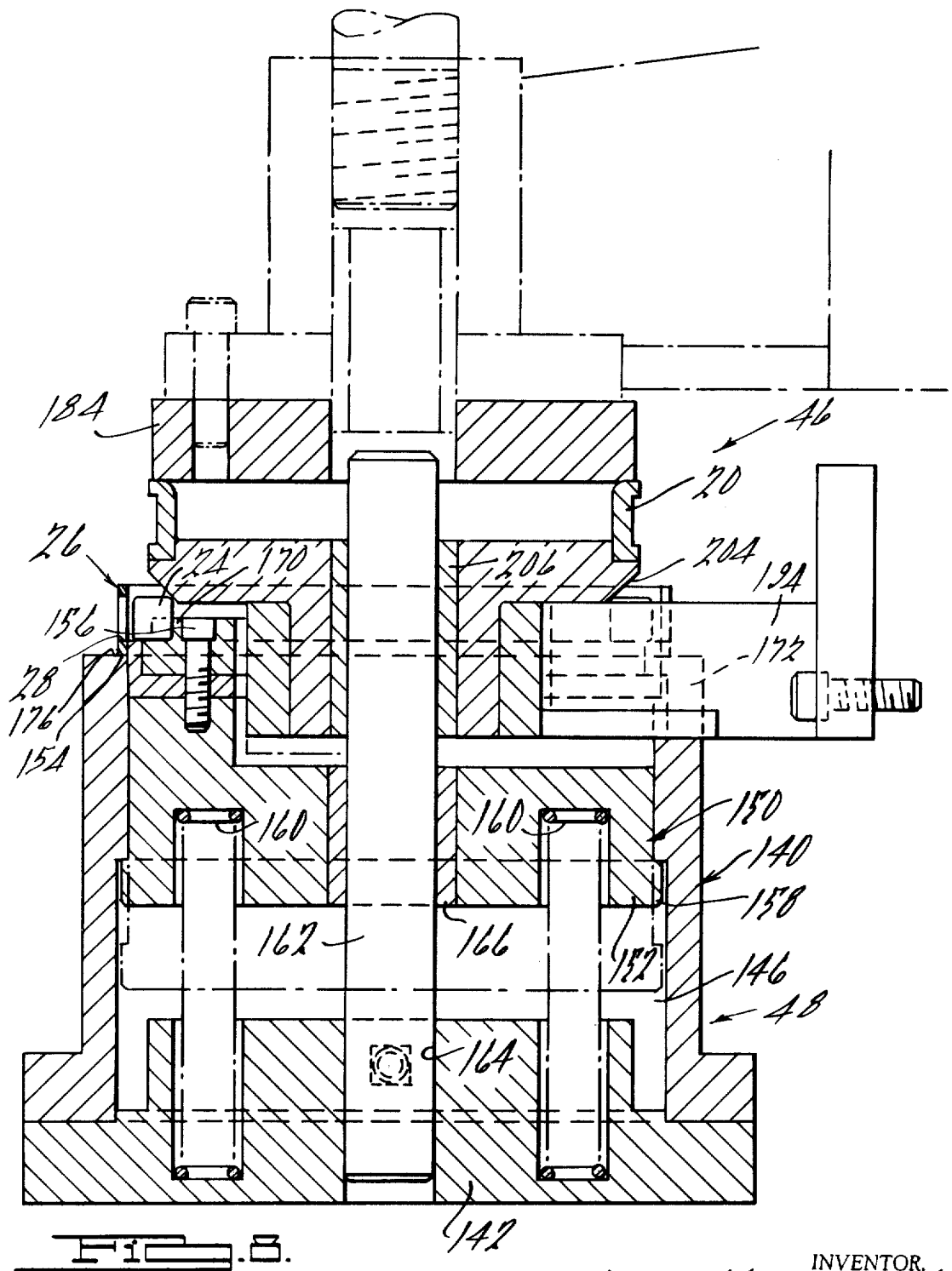

INVENTOR.
Kenneth Secunda
BY
Harness, Dickey & Pierce
ATTORNEYS.

ROLLER BEARING ASSEMBLY FIXTURE

SUMMARY-BACKGROUND OF THE INVENTION

The present invention relates to apparatus for assembling rollers into pockets in a retainer.

Many retainer designs have evolved in the prior art to permit rollers to be assembled onto a double shouldered race member. Where the retainer is a continuous ring special pocket designs have been utilized which permit the rollers to be snapped into and retained within the pocket. Where a split retainer has been used, the rollers can be assembled manually one at a time. In the present invention, apparatus has been provided whereby the rollers can be automatically or semi-automatically assembled onto a double shouldered race member and in a split retainer.

Therefore it is an object of the present invention to provide apparatus of the above described type; it is another object to prOvide apparatus for automatically or semi-automatically assembling rollers in a split retainer on a double shouldered race.

Other objects, features, and advantages of the present invention will become apparent from the subsequent description and the appended claims, taken in conjunction with the accompanying drawings, in which:

FIG. 2 is an enlarged sectional view of the roller feed section of FIG. 1 taken generally along the line 2—2 in FIG. 1;

FIG. 3 is a diametrical sectional view of the roller feed section similar to FIG. 2 but taken generally 90° to the section of FIG. 2;

FIG. 4 is a sectional view of the apparatus of FIG. 1 with some parts shown in elevation and generally showing the roller feed section and taken generally along the line 4—4 in FIG. 1;

FIG. 7 is a side elevational view, to enlarged scale, of the apparatus of FIG. 1 generally depicting the roller assembly section;

FIG. 8 is a sectional view to enlarged scale, taken generally along the line 8—8 in FIG. 1 and showing the apparatus with the rollers in the process of assembly;

FIG. 9 is a sectional view similar to FIG. 8 with the rollers shown assembled;

Figure 10:
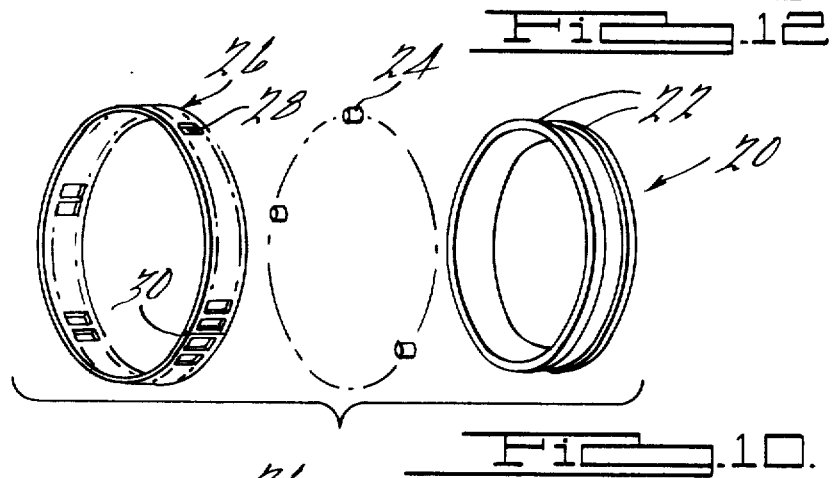
FIG. 10 is a pictorial exploded view showing the rollers, split retainer and double shouldered race member.
Figure 11:
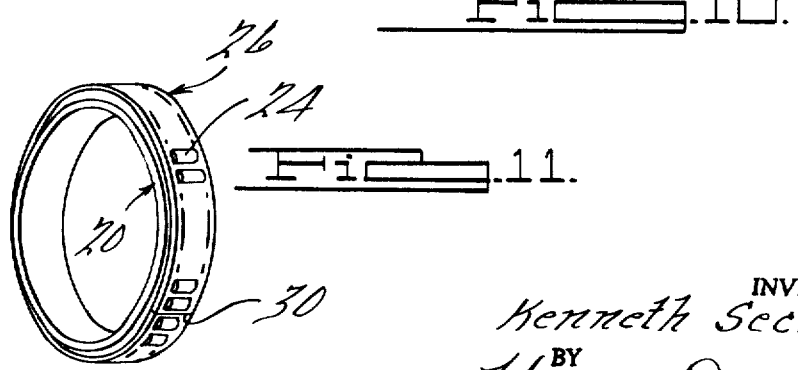
FIG. 11 is a pictorial view showing the components of FIG. 10 as assembled.

Looking now to FIGS. 10 and 11 a race member 20 having double shoulders 22 is adapted to receive a plurality of cylindrical rollers 24 which rollers 24 are held in assembly to the race member 20 via a split retainer 26. The retainer 26 is made of flat strip stock which has been cut to length and punched to provide windows 28 to receive the rollers 24 and is then rolled into a substantially circular shape with confronting ends separated by a gap 30. The apparatus of the present invention provides a simple and rapid way to assemble the rollers 24 and retainer 26 onto the double shouldered race member 20. Once assembled the retainer 26 can be clamped to close the gap 30 and the ends welded together to complete the assembly. The present invention relates directly only with the initial assembly preparatory to the welding step.

Looking now to the drawings the assembly aPparatus is generally indicated by the numeral 40 and includes a support table 42 and a roller feed section 44 and roller assembly section 46. A single assembly fixture section 48 is movably locatable between sections 44 and 46 and performs a separate function at each section. The fixture section 48 is slidably supported upon table 42 via a guide assembly 50 and can be moved between sections 44 and 46 by a piston assembly 52.

The roller feed section 44 includes a hopper assembly 54 which is filled with rollers 24 and operated in a conventional manner to continuously feed the rollers 24 into a conventional flexible feed tube 56 which has one end 58 swivelly connected to a feeder head assembly 60 (see FIG. 2–4). The feeder head assembly 60 is supported for up and down movement via a support arm 62 which connects feeder head assembly 60 to a vertically extending slide assembly 64 which has slide supports 66 fixed to the base 52 (see FIGS. 2 and 4). The feeder head assembly 60 is selectively movable vertically up and down via a piston assembly 68.

The purpose of the feeder head assembly 60 in conjunction with the fixture section 48 is to provide and locate the required number of rollers 24 circumferentially at positions in line with the pockets or windows 28 in retainer 26. Thus the feeder head assembly 60 includes a first intermediate plate 70 which has a plurality of circumferentially spaced axially extending openings 72. The support arm 62 has a ring portion 74 which fits over a boss 76 in plate 70 and is clamped to plate 70 via an annular, axially stepped clamping ring 78 and bolts 80. A locking assembly 82 locks intermediate plate 70 to ring portion 74 to assure no relative rotation therebetween and also to assure alignment of holes 84, which are in ring portion 74, with holes 72 in plate 70 and holes 86 in clamping ring 78. A feed plate 88 is located at the bottom of intermediate plate 70 and is fixed thereto via bolts 90. Feed plate 88 has holes 92 which are located out of alignment with the inline holes 72, 84 and 86. The feed plate 88 abuts an annular flange 94 on intermediate plate 70 to define a cavity 96 in which is located a valve plate 98.

The valve plate 98 has holes 100 and can be pivoted between a first position in which holes 100 are in line with holes 72, 84 and 86 and in a second position in which holes 100 are out of line with holes 72, 84, 86 and are in line with holes 92. The valve plate 98 can be pivoted via a piston assembly 102 connected to pivot connection 104. Valve plate 98 has arcuate slots 106 which accept bolts 90 and permit the pivotal movement. Thus in the first position of valve plate 98 (holes 100 in line with holes 72, 84, 86) rollers 24 will, by gravity fill each of the holes 100 of valve plate 98 and will be held there since holes 100 are not in registry with holes 92 (FIG. 2) and hence holes 100 will be blocked by plate 88. In the second position (see FIG. 3) communication to the roller supply in holes 72, 84 and 86 is interrupted and in this position the holes 100 in valve plate 98 are in line with holes 92 in feed plate 88 and the rollers 24 in holes 100 valve plate 98 will then be fed by gravity through the openings 92 in feed plate 88. A bushing 105, centrally located within the intermediate plate 70, valve plate 98 and feed plate 88, rotatably supports the valve plate 98. Note that the feeder head assembly 60 continuously stores a supply of rollers 24 for future use.

The feeder head assembly 60 has an inlet feeder plate 108 to which the swivel connection 58 is secured. The swivel connection 58 and inlet plate 108 define an inlet or feed passage 110 (FIG. 3) which is in line with the hole circle locating the holes 86, 84, 72 etc. The inlet feeder plate 108 is rotatably mounted and as it is rotated the feed passage 110 is moved to successive positions in line with successive holes 86 and in this manner will permit a roller 24 to be located in each hole 86 to thereby fill the feeder head assembly 60. A stepped shaft 112 is partially located in an enlarged bore in intermediate plate 70 in line with bushing 105 and supports a ball bearing assembly 114 upon which inlet feeder plate 108 is supported. A needle bearing assembly 116 is located between a reduced diameter portion 118 of stepped shaft 112 and an in line bore in inlet feeder plate 108 to facilitate rotation therebetween. A bolt 120 engaging a groove 122 in shaft 112 secures the shaft 112 from vertical movement and a plate and screw assembly 124 secures the inlet feeder plate 108 from vertical movement. Thus the inlet feeder plate 108 is supported for rotation via bearings 114 and 116 and will continuously feed rollers 24 into the different ones of the aligned bores 86, 84, etc.

The feeder plate 108 has an annular groove 126 into which extend a plurality of drive pins 128, which are generally equally circumferentially disposed. An endless roller chain 130 is driven by a sprocket 132 and engages the pins 128 whereby the feeder plate 108 is driven in synchronism with the sprocket 132. The sprocket 132 is driven through a drive shaft assembly 134 which is connected to a gear and motor assembly 136. The gear and motor assembly 136 is fixed to table 42 while the sprocket 132 is movable vertically with the feeder head assembly 60 via a slide assembly 138. The drive shaft assembly 134 is of a telescoping type to permit the relative vertical movement between sprocket 132 and gear and motor assembly 136.

As noted the fixture section 48 is fixed from vertical movement from the table 42 but can be moved from the roller feed section 44 (the position shown in FIGS. 1–6) to the roller assembly section 46 (the position shown in FIGS. 7-9). In the roller feed section 44, the feeder head assembly 60 is moved vertically towards and away from the fixture section 48 to accomplish a preliminary assembly of retainer 26 and rollers 24. This will be understood after a description of the fixture section 48.

Figure 1:
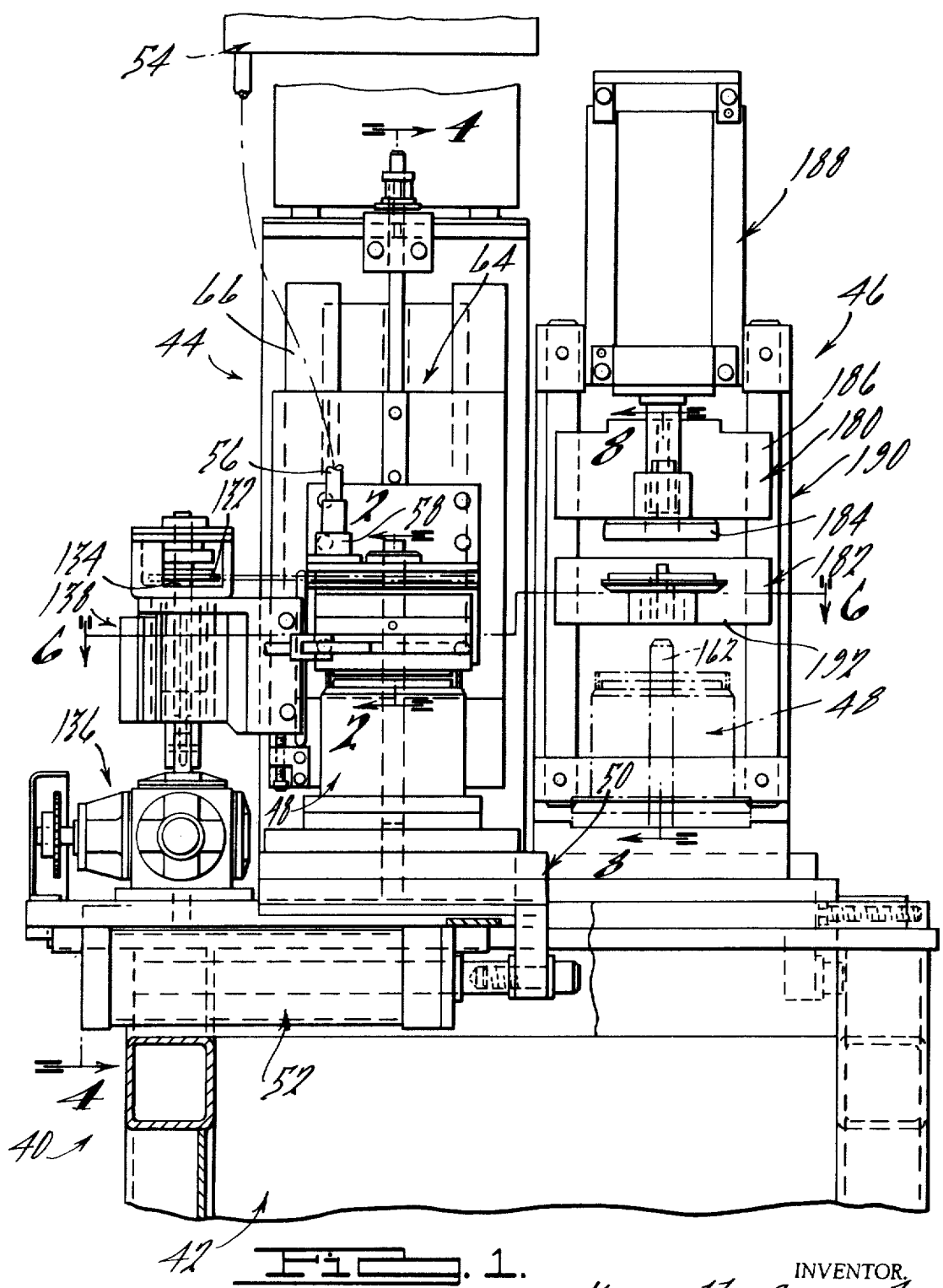
FIG. 1 is a front elevational view of apparatus embodying features of the present invention and including roller feed and roller assembly sections.
Figure 5:
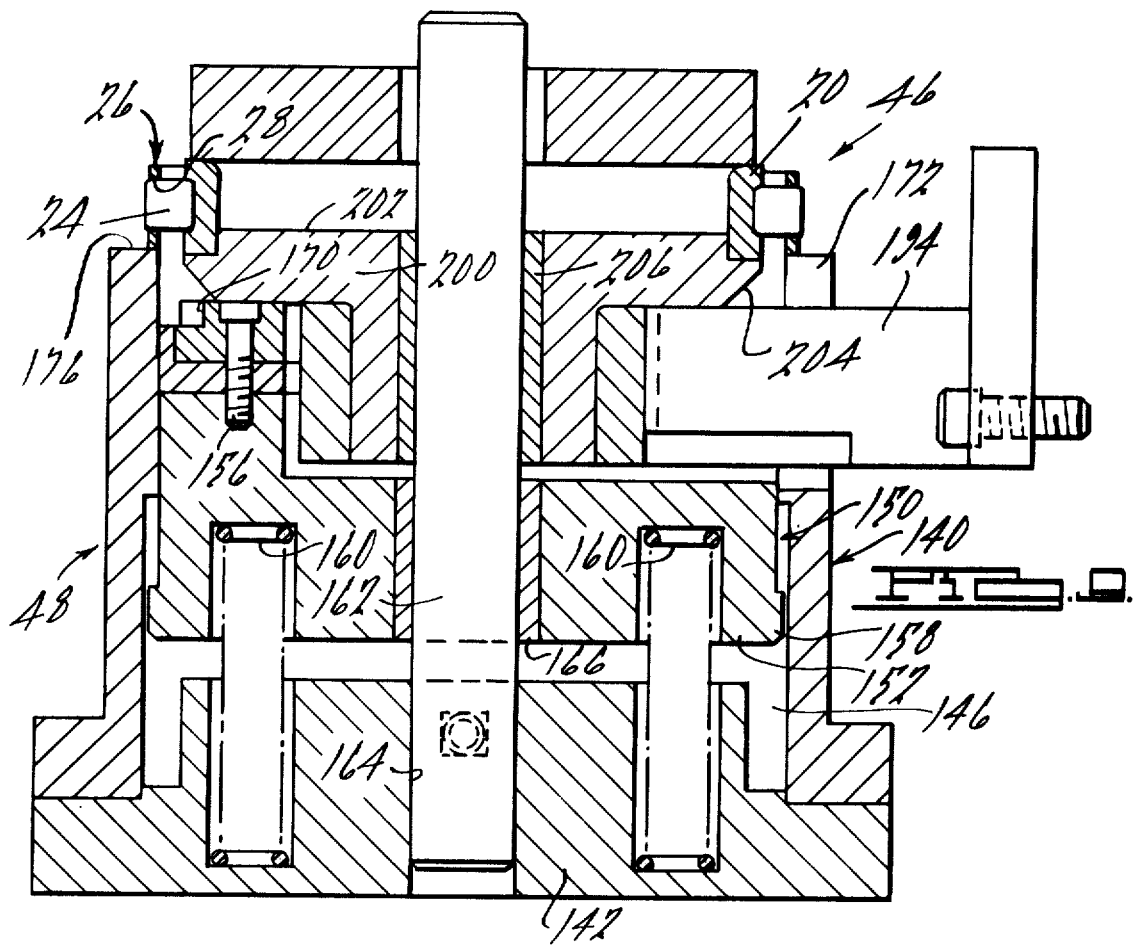
FIG. 5 is a side elevational view of the apparatus of FIG. 1 with some parts shown in section and generally showing a part of the roller feed section.
Figure 6:
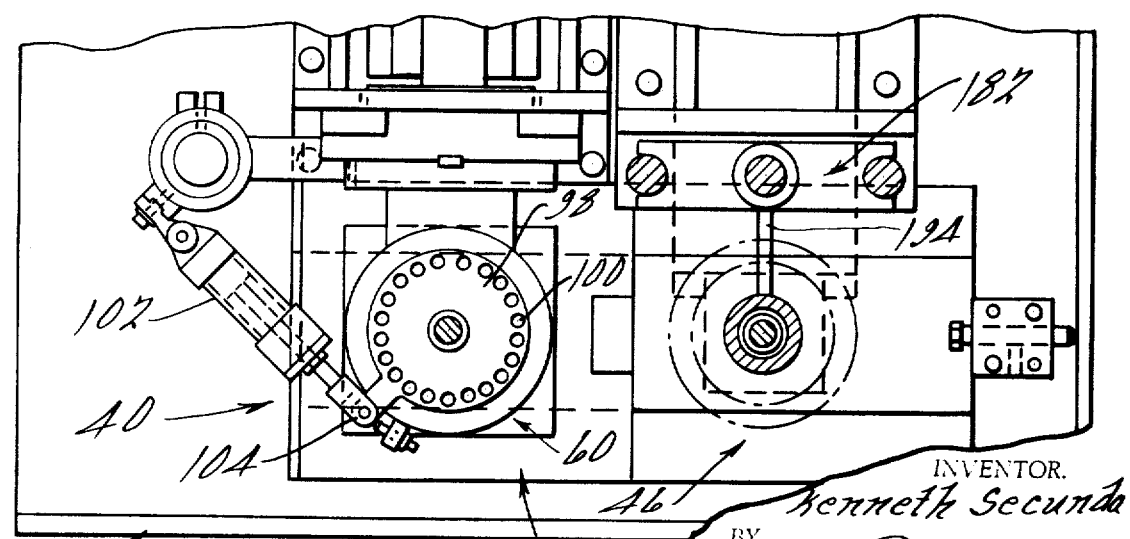
FIG. 6 is a sectional view of the apparatus of FIG. 1 taken generally along the line 6—6 on FIG 1.

Looking now to FIG. 3 (and also to the alternate position shown in FIGS. 8 and 9), the fixture section 48 includes a generally tubular outer housing 140 which is generally closed at the lower end with a base plate 142 secured to the housing 140 via bolts 144. The housing 140 has a stepped bore 146 which defines a shoulder 148 which acts as an upper stop for a movable plate assembly 150. The plate assembly 150 includes a support plate 152 which has an assembly plate 154 secured to its upper end via bolts 156. The support plate 152 is slidably located in bore 146 and has a flange 158 which is engageable with top shoulder 148. Springs 160 located in appropriate bores in support plate 152 and base plate 142 normally urge the plate assembly 150 upwardly against the stop 148. A guide rod 162 is vertically movable through a bore 164 in base plate 142 and extensible through a locating bushing 166 centrally supported to support plate 152. The guide rod 162 is also extensible through bushing 105 in the feeder head assembly 60 whereby the latter assembly is properly aligned with the fixture section 48. The assembly plate 154 has a circular, offset portion 168 which is scalloped circumferentially to define a plurality of open pockets 170 which are generally equally circumferentially disposed and are of a size to receive the rollers 24. The pockets 170 are aligned with the openings 92 in feed plate 88 (feeder head assembly 60); thus when the feeder head assembly 60 is located in its vertically down position relative to the fixture section 48 (as shown in FIGS. 1–3), upon actuation of the valve plate 98 to its alternate position, aligning holes 100 with holes 92, the rollers 24 carried by valve plate 98 will then drop into pockets 170.

Figure 12:
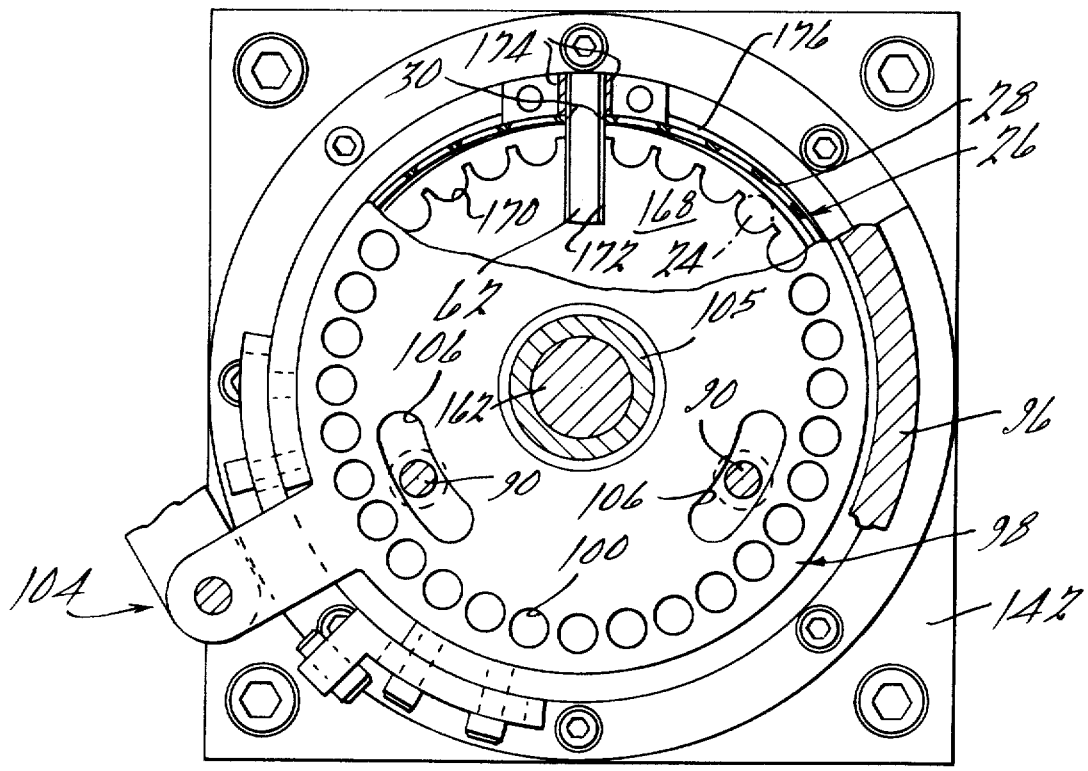
FIG. 12 is a sectional view taken generally along the line 12—12 in FIG. 3 with parts broken away.

The housing 140 and plate assembly 150 are provided with a vertical slot 172 (see FIG. 12) at its inner side which serves a purpose to be described. On opposite sides of slot 172 at the upper surface 176 of housing 140 are located a pair of alignment stops 174. In the first assembly step the feeder head assembly 60 is located in its vertically uppermost position, via actuation of piston assembly 68, in which it is separated from guide rod 162. Next the retainer 26 is located on the upper surface 176 and the gap 30 is opened sufficiently such that the opposite ends of retainer 26 will engage the alignment stops 174. In this position the pockets 28 in the retainer 26 are in radial alignment with the pockets 170. Next the piston assembly 68 is actuated to move the feeder head assembly 60 vertically downwardly where it is guided and aligned by guide rod 162. Next the valve plate 98 is moved to its alternate or feed position by actuation of piston assembly 102; in this position the rollers 24 in the valve plate 98 are deposited in the pockets 170 in assembly plate 154. Next the piston head assembly 68 is actuated to Move the feeder head assembly 60 vertically upwardly to clear the fixture section 48 to complete the first, preliminary assembly operation and the valve plate 98 is returned to its load position to receive another set of rollers 24.

Now the fixture section 48 is moved to the roller assembly section 46 via actuation of the piston assembly 52. The roller assembly section 46 (look now to FIGS. 1, 6, 7, 8 and 9) includes a ram assembly 180 and a cam assembly 182. The ram assembly 180 includes a ram head 184 which is secured to a slide assembly 186 which in turn is connected with a piston assembly 188. The piston assembly 188 is secured to a guide assembly 190 which is fixed to the table 42 and which receives the slide assembly 186 for relative, vertical sliding motion. The cam assembly 182 is fixed to a slide assembly 192 via a support arm 194 with the slide assembly 192 also mounted to the guide assembly 190. The cam slide assembly 192 is connected to the ram slide assembly 186 by a lost motion connection (the details of which are now shown for simplicity) whereby in their normal raised positions the ram assembly 180 is separated from cam assembly 182 but when the cam assembly is lowered (via piston assembly 188) this separation will be maintained until cam assembly 182 engages the fixture section 48 and ram assembly 180 will eventually engage the cam assembly 182.

The cam assembly 182 includes a circular support plate 200 supported on arm 194 with the support plate 200 having a locating shoulder 202. The shoulder 202 is of a size to receive a double shoulder race 20 and to locate it in a desired position. The plate 200 has a beveled, cam surface 204 at its lower end and is dimensioned to taper from a diameter less than that of the outside diameter of the race 20 to a diameter equal to that of the race 20. Upon actuation of the piston 188 the ram assembly 180 and cam assembly 182 both are moved downwardly. The cam assembly 182 is piloted onto guide rod 162 via guide bushing 206 which is centrally located in plate 200. The cam assembly moves downwardly until the cam surface 204 engages the tops of rollers 24 with the arm 194 moving through the slot 172 (see FIG. 8). Next the ram assembly 180 is moved relative to cam assembly 182 (via lost motion connection) until the ram head 184 engages the top of race 20 and the cam assembly 182 is moved further downwardly. As this occurs the cam surface 204 cams the rollers 24 radially outwardly into the pockets 28 of split retainer 26. Note that surface 176 locates retainer 26 such that the pockets 28 are radially in line with rollers 24. Next the retainer 26 will be expanded with its free ends at gap 30 opening away from guides 176, with the rollers 24 in pockets 28, until the rollers 24 clear the shoulder of the race member 20. Upon further downward movement the support plate 200 engages the movable plate assembly 150 moving it downwardly against the bias of springs 160. This vertical actuation continues until the plate assembly 150 is moved completely away from rollers 24 and retainer 26 (which is vertically stationarily held on surface 176 on housing 140) and until the rollers 24 are past the leading shoulder and are in line with the raceway of race member 20 (see FIG. 9); in this position the retainer 26 will move to contract and the rollers 24 will be moved into the raceway between shoulders 22 and now the rollers 24 and retainer 26 will be held to the race member 20 (to define the assembly of FIG. 11) and this assembly will be held such as to move with the cam assembly 182. Next the piston 188 is actuated to move the ram assembly 180 and cam assembly 182 upwardly to their initial positions (see FIG. 7) with the roller assembly of the race member 20, rollers 24 and retainer 26 being taken away from the fixture section 48; upon completion of this step the roller assembly can then be removed. The fixture section 48 can then be returned to its initial position at roller feed section 44 and the steps can be repeated.

With the apparatus as described, rollers can substantially automatically and in a simplified manner by assembled to a double shoulder race with a split retainer. The retainer can be welded at gap 30 and the assembly is completed.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. Apparatus for assembling a plurality of rollers within the pockets of a split retainer and on to a race member, comprising: first means for supporting the retainer, second means for supporting and locating a plurality of rollers each in radial alignment with one of the pockets of the retainer, and third means for camming the plurality of rollers into the pockets, and
with said third means supporting the race member and operable for expanding the retainer during camming of the rollers and locating the race member in a position to receive the rollers while the retainer is expanded.

2. The apparatus of claim 1 with said first means supporting the retainer in a first expanded condition and with said third means further expanding the retainer to a second expanded condition.

3. The apparatus of claim 2 with said first expanded condition locating the cammed rollers in the retainer pockets into the raceway of the race member whereby the retainers, rollers and race member are held together as an assembly.

4. The apparatus of claim 1 with said second means including storage means for storing a plurality of rollers in circumferentially spaced positions corresponding to the spaced position of the pockets.

5. The apparatus of claim 4 with said second means further including feed means for continuously feeding rollers to said storage means.

6. The apparatus of claim 5 with said feed means feeding rollers consecutively to said storage means to said spaced positions.

7. The apparatus of claim 4 further comprising valve means selectively operable for receiving one set of rollers from said storage means and for transmitting the one set of rollers to said second means.

8. The apparatus of claim 7 with said storage means comprising a plurality of axially spaced passageways at said spaced positions, said valve means comprising a valve plate assembly having a plurality of openings and, being actuable to one condition with said openings in line with said spaced passageways and blocked from said second means whereby said valve plate assembly will receive one set of rollers from said storage means, said valve plate assembly being actuable to another condition with said openings blocked from said spaced passageways and open to said second means whereby the set of rollers will be transmitted to said second means.

9. The apparatus of claim 8 with said second means comprising a locating plate having a plurality of generally semi-circular openings in radial alignment with the pockets of the retainer.

10. The apparatus of claim 9 with said feed means, said storage means, and said valve means, being movable relatively to said second means.

11. The apparatus of claim 10 with said feed means, said storage means and said valve means, being connected in a common assembly for movement relative to said second means.

12. The apparatus of claim 11 with said common assembly being supported on an arm supported for vertical movement.

13. The apparatus of claim 1 with said third means comprising a cam plate having a beveled, circumferential cam surface engageable with the rollers for camming the rollers and with said cam plate having a support portion for locating and supporting the race member.

14. The apparatus of claim 13 with said second means including a housing having a vertical slot and having guide means located on opposite sides of said slot for engaging the free ends of the retainer to hold the retainer in a first expanded condition, said cam plate being supported on an arm member supported for vertical movement with said arm member being movable through said vertical slot.

15. The apparatus of claim 14 with said first means and said second means being located in one assembly and with said second means being supported for movement vertically relative to said first means, said second means being engageable by said third means to be moved out of alignment with the retainer after said cam plate has cammed the set of rollers into the retainer pockets and while the race member is being moved in alignment with the retainer and rollers.

16. The apparatus of claim 15 with said first means supporting the retainer in a first expanded condition and with fourth means further expanding the retainer to a second expanded condition.

17. The apparatus of claim 16 with said first expanded condition locating the cammed rollers in the retainer pockets into the raceway of the race member whereby the retainers, rollers and race member are held together as an assembly.

18. The apparatus of claim 17 with said second means comprising storage means for storing a plurality of rollers in circumferentially spaced positions corresponding to the spaced position of the pockets.

19. The apparatus of claim 18 with said second means comprising feed means for continuously feeding rollers to said storage means.

20. The apparatus of claim 19 with said feed means feeding rollers consecutively to said storage means to said spaced positions.

21. The apparatus of claim 20 further comprising valve means selectively operable for receiving one set of rollers from said storage means and for transmitting the one set of rollers to said second means.

22. The apparatus of claim 21 with said storage means comprising a plurality of axially spaced passageways at said spaced positions, said valve means comprising a valve plate assembly having a plurality of openings and, being actuable to one condition with said openings in line with said spaced passageways and blocked from said second means whereby said valve plate assembly will receive one set of rollers from said storage means, said valve plate assembly being actuable to another condition with said openings blocked from said spaced passageways and open to said second means whereby the set of rollers will be transmitted to said second means.

23. The apparatus of claim 22 with said feed means, said storage means, and said valve means, being movable relatively to said second means.

24. The apparatus of claim 23 with said feed means, said storage means and said valve means, being connected in a common assembly for movement relative to said second means.

25. The apparatus of claim 23 with said one assembly being supported for horizontal movement between the position of said common assembly and said third means.

26. The apparatus of claim 25 with said third means including a ram assembly connected by a lost motion connection to said cam plate with said ram assembly being actuable to vertically move said cam plate and being operable with said cam plate to move said cam plate vertically downwardly under an actuating force to move said second means vertically downwardly after the rollers have cammed into the retainer pockets.

27. Apparatus for assembling a plurality of rollers within the pockets of a retainer and on to a race member, comprising: first means for supporting the retainer, second means for supporting and locating a plurality of rollers each in radial alignment with one of the pockets of the retainer, and third means for camming the plurality of rollers into the pockets, and
with said third means supporting the race member and operable for slightly non-permanently deforming the retainer during camming of the rollers and locating the race member in a position to receive the rollers while the retainer is slightly deformed.

* * * * *